S. B., C. E. & W. R. HILL.
VALVE STRUCTURE.
APPLICATION FILED SEPT. 27, 1912.

1,088,341.

Patented Feb. 24, 1914.

2 SHEETS—SHEET 1.

Witnesses

Inventors
Climie E. Hill
Stirling B. Hill
William R. Hill

By
C. L. Parker
Attorney

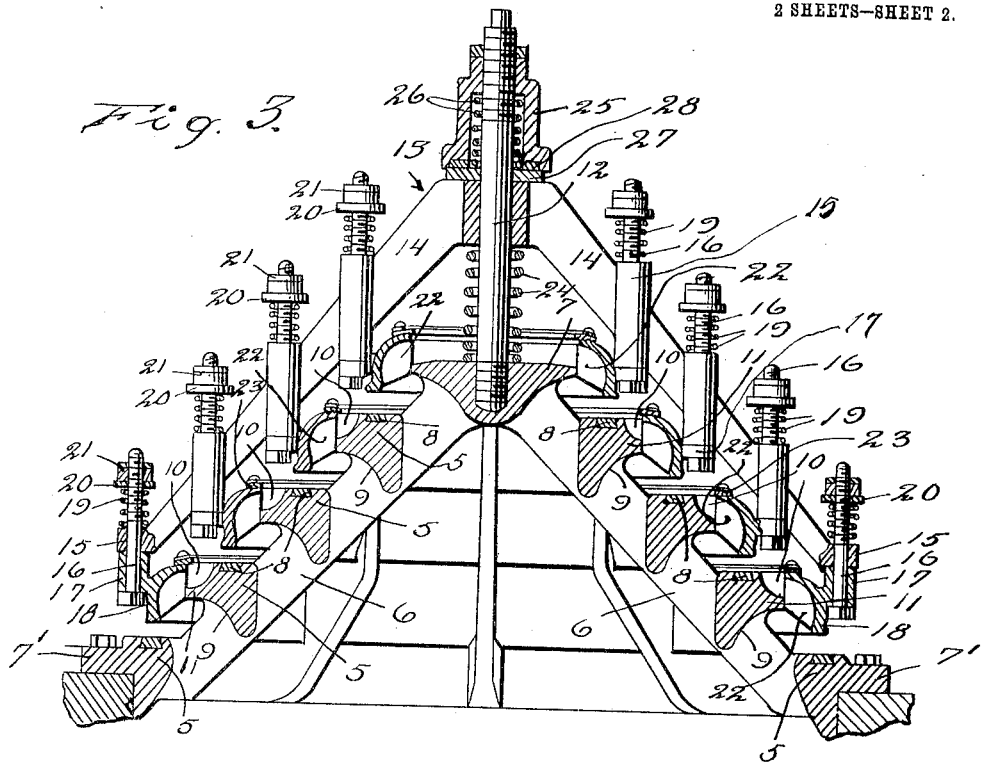
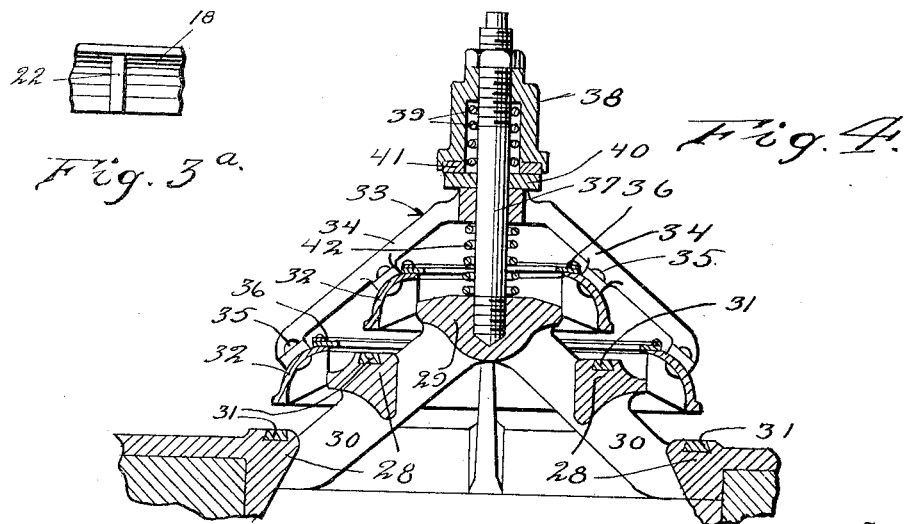

UNITED STATES PATENT OFFICE.

STIRLING B. HILL, CLIMIE E. HILL, AND WILLIAM R. HILL, OF SEATTLE, WASHINGTON.

VALVE STRUCTURE.

1,088,341. Specification of Letters Patent. Patented Feb. 24, 1914.

Application filed September 27, 1912. Serial No. 722,665.

*To all whom it may concern:*

Be it known that we, STIRLING B. HILL, CLIMIE E. HILL, and WILLIAM R. HILL, citizens of the United States, residing at Seattle, in the county of King and State of Washington, have invented certain new and useful Improvements in Valve Structures, of which the following is a specification.

The present invention relates to valve structures and has particular reference to such devices which are particularly well adapted to be used in hydraulic rams but not solely restricted to this use.

An important object of the invention is to provide a valve structure embodying a plurality of spaced annular valves to control the passage of a large volume of water, as is required of valves used in large hydraulic rams.

A further object of the invention is to provide a valve structure of the above mentioned character, which is automatic and positive in operation, simple in construction, free from undue shocks during operation, whereby it is durable, and not liable to derangements.

Other objects and advantages of the invention will be apparent during the course of the following description.

Figure 1:
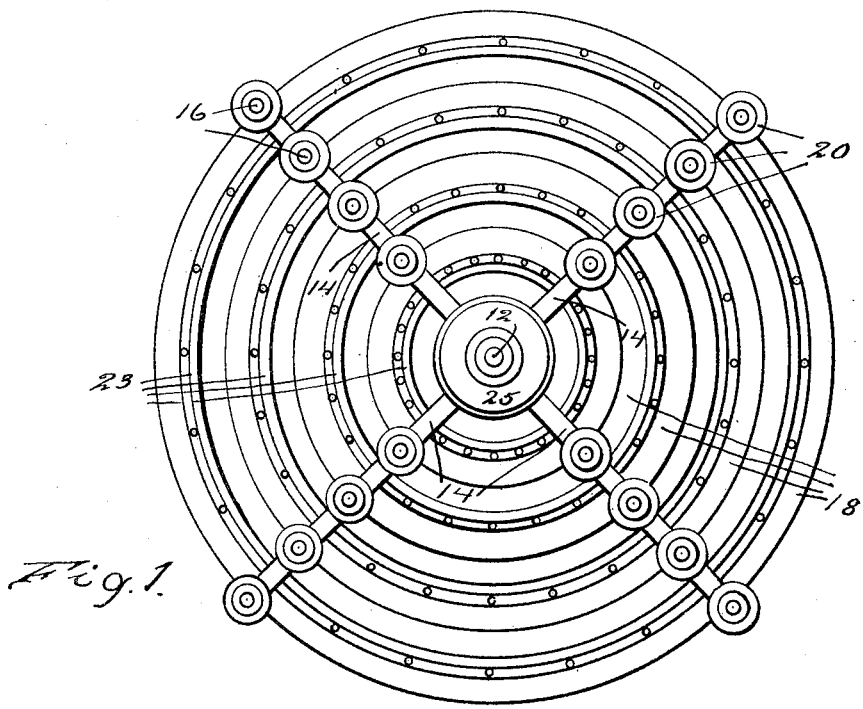
Figure 2:
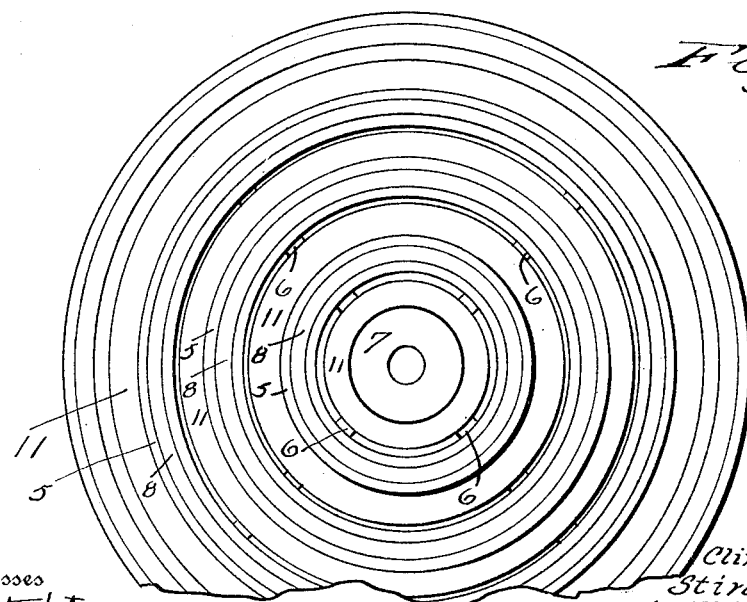

In the accompanying drawings forming a part of this specification and in which like numerals are employed to designate like parts throughout the same, Figure 1 is a plan view of the valve structure, Fig. 2 is a similar view of the annular valve seats with the annular valves removed, Fig. 3 is a central vertical sectional view through the valve structure, Fig. 3ª is a fragmentary inner side view of one of the annular valves, and, Fig. 4 is a similar view of a slightly modified form of the invention.

In the drawings wherein for the purpose of illustration, we have shown a preferred embodiment of our invention, the numeral 5 designates a plurality of spaced concentric superposed annular valve seats, which are rigidly connected by an inner frame including legs or ribs 6, connected at their upper ends with a central plate 7. The lowermost annular valve seat 5 is provided with an outwardly extending flange 7′, to be supported or otherwise rigidly attached to a portion of a hydraulic ram or other support. The annular valve seats 5 are provided upon their upper surfaces with annular grooves for receiving packing rings 8, as shown. All of the annular valve seats 5 except the lowermost has its lower surface transversely curved, as shown at 9. All of the valve seats except the lowermost are provided with recesses 10, which are segmental in cross-section, to provide reduced extensions 11.

Rigidly connected with the plate 7 is a vertical post or rod 12, upon which is mounted to reciprocate a rigid frame 13, including spaced preferably diametrically arranged legs 14. The legs 14 are provided with upstanding cylindrical enlargements or sleeves 15, through which are mounted to reciprocate pins or bolts 16. These bolts have their lower ends rigidly connected with extensions 17, which are preferably cast integral with annular valves 18. Surrounding the upper portions of the bolts 16 are compressible coil springs 19 engaged by washers 20, which are held in place by adjusting nuts 21, as shown. The annular valves 18 are curved in cross-section, as shown, and are provided with four webs 22, which engage the extensions 11 of the valve seats 5. These webs 22 are preferably cast integral with the annular valve 18 and serve as guides to secure the proper seating of the valves. The annular valves 18 descend to engage the packing rings 8 and said annular valves carry rings 23 which engage above the extensions 11. The uppermost guide webs 22 slidably engage the periphery of the ring 7, as shown.

Surrounding the post 12 is a coil spring 24, which normally serves to hold the annular valves 18 in their upper or unseated positions. The valve structures shown in Figs. 1, 2, 3 and 4 is a waste valve structure of a hydraulic ram and as is well known, such valve structures are closed by the water impinging against the normally open valves to seat them. The water impinges against the annular valves 18 and moves them downwardly into engagement with their valve seats, in opposition to the spring 24. When the speed of the water is sufficiently decreased the spring 24 will again raise the annular valves. Surrounding the upper end of the post 12 is a cap nut 25, receiving therein a spring 26, which engages a ring 27. A packing ring 28 is disposed within an annular recess formed in the lower end of the cap nut 25. The spring 26 serves to stop the upward movement of the frame 13 and takes up the shocks from the same. It is obvious that there is a yielding connection between the annular valves 18 and the frame 13, which allows sufficient play to insure the even seating of each valve ring due to the fact that the impinging water may move the valve downwardly slightly without moving the frame 13, but otherwise serves to hold the frame and valve rings in rigid connection.

Attention is called to the fact that the pressure of the water impinging upon the annular valves 18 causes them and the frame 13 to descend, while the frame moved by the spring 24 causes the annular valves to rise. Means (not shown) are provided for regulating the tension of the spring and thus the capacity of the ram. In place of the helical spring 24, a leaf spring may be used to raise the valve structure. This valve may also be used as a discharge or check valve by removing spring 24 or substituting therefor a lighter one of sufficient stiffness only to balance the weight to the valves. In this case the spring 26 receives the shock of the opening valves and acting through the frame urges them into their closed position.

In Fig. 4 we have illustrated a slightly different form of valve, in which the valve rings are rigidly connected with the frame. This valve structure includes spaced superposed annular valve seats 28 and an upper plate 29, which are rigidly connected by an inner frame including spaced preferably diametrically arranged legs or ribs 30. The valve seats 28 are provided with annular grooves for receiving packing rings 31.

The numeral 32 designates annular valves, which are curved in cross-section, as shown. These valves are suitably spaced and are rigidly connected with a rigid frame 33 comprising spaced preferably diametrically arranged legs 34. This connection is afforded by bolts 35 or the like. The annular valves 32 engage the packing rings 31 and carry at their upper ends packing rings 36 which extend inwardly to engage portions of the valve seats 28. The frame 33 is mounted to reciprocate upon a vertical post 37 which is rigidly connected with the plate 29. Mounted upon the upper portion of the post 37 is a cap nut 38, receiving a spring 39 therein, which spring engages a ring 40, which in turn engages the upper end of the frame 33, to check the upward movement of the frame and absorb the shock of the same. A packing ring 41 is disposed between the ring 40 and the cap 38. A spring 42 surrounds the lower portion of the post 36 and engages the frame 33 when the same is moved downwardly, and is adapted to elevate the frame to unseat the valves 32. The valves 32 are seated by pressure of the flowing water when the pressure is sufficient to overcome the spring 42 and are unseated by this spring when the pressure is relieved. A leaf spring may be used in place of the helical spring 42 to unseat the valve. This valve may also be used as a discharge or check valve.

It is to be understood that the forms of our invention herewith shown and described are to be taken as preferred examples of the same, and that certain changes in the shapes, sizes, and arrangements of parts may be resorted to without departing from the spirit of the invention or the scope of the subjoined claims.

Having thus described our invention, we claim:—

1. In a valve structure of the character described, the combination with a central support, of a plurality of open continuous valve seats surrounding the same, a corresponding number of open continuous valves surrounding the support and adapted to engage the valve seats, a frame slidably mounted upon the central support, yielding means connecting the valves with the frame to allow the same to move slightly in one direction with relation thereto, and yielding means to oppose the movement of the frame in one direction.

2. In a valve structure of the character described, a plurality of spaced annular valve seats, a plurality of spaced annular valves to engage and disengage the valve seats, a movable frame, and bolts connected with the annular valves and yieldingly connected with the frame.

3. In a valve structure of the character described, a plurality of spaced annular valve seats, a plurality of spaced annular valves to engage and disengage said valve seats, a reciprocatory frame, bolts attached to the annular valves and movably mounted within openings formed through the frames, and springs surrounding the bolts to oppose their longitudinal movement in one direction.

In testimony whereof we affix our signatures in presence of two witnesses.

STIRLING B. HILL.
    CLIMIE E. HILL.
    WILLIAM R. HILL.

Witnesses:
 NEAL C. HAWLEY,
 R. W. HUNTOON.